US011875718B2

(12) United States Patent
Rao

(10) Patent No.: US 11,875,718 B2
(45) Date of Patent: Jan. 16, 2024

(54) CORRECTION METHOD FOR COLOR TEMPERATURE CURVE AND DISPLAY DEVICE

(71) Applicant: BOE TECHNOLOGY GROUP CO., LTD., Beijing (CN)

(72) Inventor: Tianmin Rao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/482,753

(22) Filed: Sep. 23, 2021

(65) Prior Publication Data

US 2022/0101771 A1 Mar. 31, 2022

(30) Foreign Application Priority Data

Sep. 27, 2020 (CN) ......................... 202011034319.8

(51) Int. Cl.
*G09G 3/20* (2006.01)

(52) U.S. Cl.
CPC ... *G09G 3/2003* (2013.01); *G09G 2320/0666* (2013.01)

(58) Field of Classification Search
None
See application file for complete search history.

(56) References Cited

U.S. PATENT DOCUMENTS 11,062,636 B1 * 7/2021 Fu ......................... G09G 3/2003
2015/0245003 A1 * 8/2015 Lu ......................... H04N 1/6077
348/225.1
2016/0284284 A1 * 9/2016 Liu ...................... G09G 3/2003
2018/0286349 A1 * 10/2018 Mohammadi .......... G01K 13/00
2018/0336811 A1 * 11/2018 Jin .......................... G09G 3/20
2019/0206365 A1 * 7/2019 Yin .......................... G09G 5/10

FOREIGN PATENT DOCUMENTS

CN 101894541 A 11/2010
CN 102419947 A 4/2012
CN 105336307 A 2/2016
TW 200929128 A 7/2009

OTHER PUBLICATIONS

Chinese First Office Action (w/ English translation) for corresponding Chinese Application No. 202011034319.8, dated Oct. 8, 2022, 14 pages.

* cited by examiner

*Primary Examiner* — Benjamin C Lee
*Assistant Examiner* — Emily J Frank
(74) *Attorney, Agent, or Firm* — Dority & Manning, P.A.

(57) ABSTRACT

A correction method for a color temperature curve includes: obtaining pixel values of a display device, and the pixel values including at least two first pixel values and second pixel values; obtaining at least two first standard pixel values according to the at least two first pixel values, and a color temperature value corresponding to each first standard pixel value being a standard color temperature value; determining at least one correction interval according to the at least two first standard pixel values and the second pixel values, and a correction interval including two first standard pixel values and at least two second pixel values therebetween; and correcting the at least two second pixel values to obtain at least two second standard pixel values according to the two first standard pixel values, and a color temperature value corresponding to each second standard pixel value being within a preset color temperature range.

15 Claims, 9 Drawing Sheets

CORRECTION METHOD FOR COLOR TEMPERATURE CURVE AND DISPLAY DEVICE

CROSS-REFERENCE TO RELATED APPLICATION

This application claims priority to Chinese Patent Application No. 202011034319.8, filed on Sep. 27, 2020, which is incorporated herein by reference in its entirety.

TECHNICAL FIELD

The present disclosure relates to the field of display technologies, and in particular, to a correction method for a color temperature curve and display devices.

BACKGROUND

Display products, such as monitors, have higher requirements for color of display images. Different color temperatures will make display images with the same color be warmer or colder. For example, in a case where the color temperature is relatively low, the display image will be warmer, and in a case where the color temperature is relatively high, the display image will be cooler. Therefore, a stability of the color temperature in a displaying process may better improve the display effect of the display product.

SUMMARY

In an aspect, a correction method for color temperature curve is provided. The correction method includes: obtaining a plurality of pixel values of a display device, each pixel value including gray scale values of at least three sub-pixels in a pixel, and the plurality of pixel values including at least two first pixel values and a plurality of second pixel values; obtaining at least two first standard pixel values according to the at least two first pixel values, and a color temperature value corresponding to each first standard pixel value being a standard color temperature value; determining at least one correction interval according to the at least two first standard pixel values and the plurality of second pixel values, and a correction interval including two first standard pixel values and at least two second pixel values therebetween; and correcting the at least two second pixel values in the correction interval to obtain at least two second standard pixel values according to the two first standard pixel values, and a color temperature value corresponding to each second standard pixel value being within a preset color temperature range in which the standard color temperature value is located.

In some embodiments, correcting the at least two second pixel values in the correction interval to obtain the at least two second standard pixel values according to the two first standard pixel values, includes: obtaining a second standard pixel value corresponding to each of the at least two second pixel values in the correction interval through linear interpolation according to the two first standard pixel values and each of the at least two second pixel values.

In some embodiments, obtaining the second standard pixel value corresponding to each of the at least two second pixel values in the correction interval through the linear interpolation according to the two first standard pixel values and each of the at least two second pixel values, includes: obtaining a correction parameter of each first standard pixel value, the correction parameter of the first standard pixel value being related to the first standard pixel value and a first pixel value corresponding to the first standard pixel value; obtaining an interpolation parameter of the second pixel value according to the two first standard pixel values and the second pixel value; and obtaining the second standard pixel value corresponding to the second pixel value through the linear interpolation according to correction parameters of the two first standard pixel values, the interpolation parameter of the second pixel value, and the second pixel value.

In some embodiments, obtaining the second standard pixel value corresponding to each of the at least two second pixel values in the correction interval through the linear interpolation according to the two first standard pixel values and each of the at least two second pixel values, includes: obtaining a correction ratio coefficient of a gray scale value of each sub-pixel in each first standard pixel value, the correction ratio coefficient of the gray scale value of each sub-pixel in the first standard pixel value being related to a gray scale value of each sub-pixel in the first standard pixel value and a gray scale value of a corresponding sub-pixel in the first pixel value corresponding to the first standard pixel value; obtaining an interpolation step-size of a gray scale value of each sub-pixel in the second pixel value according to gray scale values of corresponding sub-pixels in the two first standard pixel values and the gray scale value of the sub-pixel in the second pixel value; and obtaining the gray scale value of the sub-pixel in the second standard pixel value through the linear interpolation according to correction ratio coefficients of the gray scale values of the corresponding sub-pixels in the two first standard pixel values, the interpolation step-size of the gray scale value of the sub-pixel in the second pixel value, and the gray scale value of the sub-pixel in the second pixel value.

In some embodiments, the gray scale value of the sub-pixel in the second standard pixel value satisfies following formulas: $Nsz=Drive\_gain\_Ns \times Nsc$, and $Drive\_gain\_Ns=Drive\_gain\_Nex+(1-D)\times Drive\_gain\_Npr$. Here, D represents the interpolation step-size of the gray scale value of the sub-pixel in the second pixel value, and D is greater than or equal to 0 and less than or equal to 1; Nsz represents the gray scale value of the sub-pixel in the second standard pixel value; Nsc represents the gray scale value of the sub-pixel in the second pixel value; Drive_gain_Ns represents a correction ratio coefficient of the gray scale value of the sub-pixel in the second standard pixel value; Drive_gain_Nex represents the correction ratio coefficient of the gray scale value of the sub-pixel in a latter first standard pixel value of the two first standard pixel values; Drive_gain_Npr represents the correction ratio coefficient of the gray scale value of the sub-pixel in a previous first standard pixel value of the two first standard pixel values.

In some embodiments, obtaining the interpolation step-size of the gray scale value of the sub-pixel in the second pixel value according to the gray scale values of the corresponding sub-pixels in the two first standard pixel values and the gray scale value of the sub-pixel in the second pixel value, includes: obtaining a color temperature value corresponding to the second pixel value; comparing the color temperature value corresponding to the second pixel value with the standard color temperature value; set the interpolation step-size of the gray scale value of the sub-pixel in the second pixel value to $(Nsc-Npr)/(Nex-Npr)$, in response to determining that the color temperature value corresponding to the second pixel value is greater than the standard color temperature value; and set the interpolation step-size of the gray scale value of the sub-pixel in the second pixel value to $(Npr-Nsc)/(Nex-Npr)$, in response to determining that the color temperature value corresponding to the second pixel value is less than the standard color temperature value. Here, Nsc represents the gray scale value of the sub-pixel in the second pixel value; Npr represents a gray scale value of a corresponding sub-pixel in a previous first standard pixel value of the two first standard pixel values; Nex represents a gray scale value of a corresponding sub-pixel in a latter first standard pixel value of the two first standard pixel values.

In some embodiments, obtaining the correction ratio coefficient of the gray scale value of each sub-pixel in each first standard pixel value, includes: calculating a ratio of the gray scale value of the sub-pixel in the first standard pixel value to the gray scale value of the sub-pixel in the first pixel value corresponding to the first standard pixel value, so that the correction ratio coefficient of the gray scale value of the sub-pixel in the first standard pixel value is obtained.

In some embodiments, obtaining the at least two first standard pixel values according to the at least two first pixel values, includes: obtaining color temperature values corresponding to the at least two first pixel values; determining whether the color temperature values corresponding to the at least two first pixel values are equal to the standard color temperature value; using the at least two first pixel values as the at least two first standard pixel values, in response to determining that the color temperature values corresponding to the at least two first pixel values are equal to the standard color temperature value; and correcting at least one first pixel value until a color temperature value corresponding to each first pixel value in the at least two first pixel values is equal to the standard color temperature value, in response to determining that at least one color temperature value corresponding to the at least one first pixel value is not equal to the standard color temperature value, so that the at least two first standard pixel values are obtained.

In some embodiments, obtaining the plurality of pixel values, includes: obtaining color temperature values corresponding to at least two pixel values of the plurality of pixel values; obtaining a color temperature gradient value corresponding to two pixel values in the at least two pixel values according to color temperature values corresponding to the two pixel values in the at least two pixel values; determining whether the color temperature gradient value corresponding to the two pixel values is equal to a preset gradient value; using the two pixel values as two second pixel values, in response to determining that the color temperature gradient value corresponding to the two pixel values is equal to the preset gradient value; and using the two pixel values as two first pixel values, in response to determining that the color temperature gradient value corresponding to the two pixel values is not equal to the preset gradient value.

In some embodiments, after obtaining the at least two second standard pixel values, the correction method further includes: obtaining a deviation value between the color temperature value corresponding to each second standard pixel value in the correction interval according to color temperature values corresponding to the at least two second standard pixel values and the standard color temperature value; determining whether the deviation value between the color temperature value corresponding to each second standard pixel value in the correction interval and the standard color temperature is greater than a preset deviation value; and re-correcting the second standard pixel value until a deviation value between a color temperature value corresponding to a re-corrected second standard pixel value and the standard color temperature value is less than or equal to the preset deviation value, in response to determining that the deviation value between the color temperature value corresponding to the second standard pixel value and the standard color temperature is greater than the preset deviation value.

In some embodiments, after obtaining the at least two second standard pixel values, the correction method further includes: obtaining a variance of the correction interval according to color temperature values corresponding to the at least two second standard pixel values in the correction interval and the standard color temperature value; determining whether the variance of the correction interval is greater than a variance threshold; and re-correcting the at least two second standard pixel values in the correction interval until a variance that is obtained according to color temperature values corresponding to at least two re-corrected second standard pixel values and the standard color temperature value is less than or equal to the variance threshold, in response to determining that the variance of the correction interval is greater than the variance threshold.

In some embodiments, the at least two second pixel values in the correction interval include at least three second pixel values; and correcting the at least three second pixel values, includes: correcting a second pixel value in the correction interval to obtain a first second standard pixel value according to the two first standard pixel values; correcting a second pixel value located between the first second standard pixel value and one of the two first standard pixel values to obtain a second second standard pixel value according to the first second standard pixel value and the one first standard pixel value; and performing following operations at least once: determining a position of a second pixel value currently to be corrected; correcting the second pixel value currently to be corrected to obtain a current second standard pixel value according to the second standard pixel value obtained in a previous correction and one of the two first standard pixel values, in response to determining that the second pixel value currently to be corrected is located between the second standard pixel value obtained in the previous correction and the one first standard pixel value; and correcting the second pixel value currently to be corrected to obtain the current second standard pixel value according to two adjacent second standard pixel values, in response to determining that the second pixel value currently to be corrected is located between the two adjacent second standard pixel values.

In some embodiments, the correction method further includes: after obtaining a first second standard pixel value, dividing the correction interval into two correction sub-intervals according to the first second standard pixel value and the two first standard pixel values, an end point of each correction sub-interval being the first second standard pixel value, and another end point of the correction sub-interval being one of the two first standard pixel values; and performing following operations at least once: updating the correction sub-interval to one correction interval, wherein two end points of the correction sub-interval serve as two first standard pixel values in the updated correction interval; correcting a current second pixel value located between the two first standard pixel values in the updated correction interval to obtain a current second standard pixel value according to the two first standard pixel values in the updated correction interval; and obtaining two updated correction sub-intervals according to the two first standard pixel values in the updated correction interval and the current second standard pixel value, an end point of each updated correction sub-interval being the current second standard pixel value, and another end point of the updated correction sub-interval being one of the two first standard pixel values in the updated correction interval.

In some embodiments, before correcting the at least two second pixel values in the correction interval, the correction method further includes: obtaining color temperature values corresponding to the at least two second pixel values in the correction interval; and determining whether the color temperature values corresponding to the at least two second pixel values are within the preset color temperature range. Correcting the at least two second pixel values, includes: using the at least two second pixel values as the at least two second standard color temperature values, in response to determining that the color temperature values corresponding to the at least two second pixel values are within the preset color temperature range; and correcting at least one second pixel value, in response to determining that at least one color temperature value corresponding to the at least one second pixel value of the at least two second pixel values is not within the preset color temperature range.

In another aspect, a display device is provided. The display device includes a memory and a processor coupled to the memory. The memory is configured to store a plurality of pixel values. Each pixel value includes gray scale values of at least three sub-pixels in a pixel, and the plurality of pixel values includes at least two first pixel values and a plurality of second pixel values. The processor is configured to: obtain the plurality of pixel values; obtain at least two first standard pixel values according to the at least two first pixel values, wherein a color temperature value corresponding to each first standard pixel value is a standard color temperature value; determine at least one correction interval according to the at least two first standard pixel values and the plurality of second pixel values, and a correction interval including two first standard pixel values and at least two second pixel values located between the two first standard pixel values; correct the at least two second pixel values in the correction interval to obtain at least two second standard pixel values according to the two first standard pixel values, and a color temperature value corresponding to each second standard pixel value being within a preset color temperature range in which the standard color temperature value is located. The memory is further configured to store the at least two first standard pixel values, and the at least two second standard pixel values and color temperature values corresponding thereto.

In some embodiments, the display device further includes a display panel. The display panel is configured to display an image according to each first standard pixel value and/or each second standard pixel value.

In yet another aspect, a display device is provided. The display device includes a memory and a processor coupled to the memory. The memory is configured to store one or more computer programs. The processor is configured to execute the one or more computer programs to implement the correction method for the color temperature curve as described in any of the above embodiments.

In yet another aspect, a non-transitory computer-readable storage medium is provided. The non-transitory computer-readable storage medium stores a computer program that, when executed by a processor, causes the processor to implement the correction method for the color temperature curve as described in any of the above embodiments.

In yet another aspect, a computer program product is provided. The computer program product includes a computer program stored in a non-transitory computer-readable storage medium. When executed by a processor, the computer program causes the processor to implement the correction method for the color temperature curve as described in any of the above embodiments.

BRIEF DESCRIPTION OF THE DRAWINGS

In order to describe technical solutions in the present disclosure more clearly, the accompanying drawings to be used in the description of some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on an actual size of a product, an actual process of a method and an actual timing of a signal involved in the embodiments of the present disclosure.

DETAILED DESCRIPTION

Figure 1A:
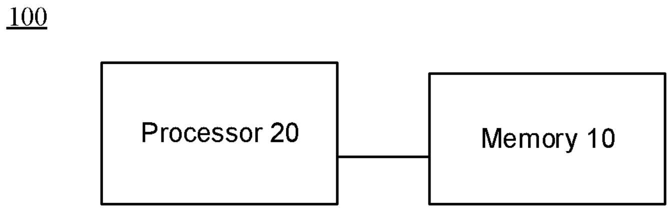
FIG. 1A is a block diagram of a display device, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the terms such as "coupled", "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" may also mean that two or more components are not in direct contact with each other but still cooperate or interact with each other. The embodiments disclosed herein are not necessarily limited to the contents herein.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The phrase "configured to" as used herein means an open and inclusive expression, which does not exclude devices that are configured to perform additional tasks or steps.

The phrase "A and/or B" includes the following three combinations: only A, only B, and a combination of A and B.

In addition, the use of the phrase "based on" is meant to be open and inclusive, since a process, step, calculation or other action that is "based on" one or more of the stated conditions or values may, in practice, be based on additional conditions or values exceeding those stated.

Some embodiments of the present disclosure provide a display device. The display device may be any device that displays an image whether in motion (e.g., a video) or stationary (e.g., a still image), and regardless of literal or graphical. The display device may be (but are not limited to), for example, a mobile phone, a wireless device, a personal data assistant (PDAs), a hand-held or portable computer, a desktop computer, a notebook, a palmtop computer, a cloud server, a global positioning system (GPS) receiver/navigator, a camera, an MPEG-4 Part 14 (MP4) video player, a video camera, a game console, a watch, a clock, a calculator, a television monitor, a flat panel display, a computer monitor, a car display (e.g., an odometer display), a navigator, a cockpit controller and/or display, a camera-view display (such as a rear view camera display in a vehicle), an electronic photo, an electronic billboard or signage, a projector, an architectural structure, a packaging and aesthetic structure (such as a display for displaying an image of a piece of jewelry). Embodiments of the present disclosure do not particularly limit a specific form of the display device.

Figure 1B:
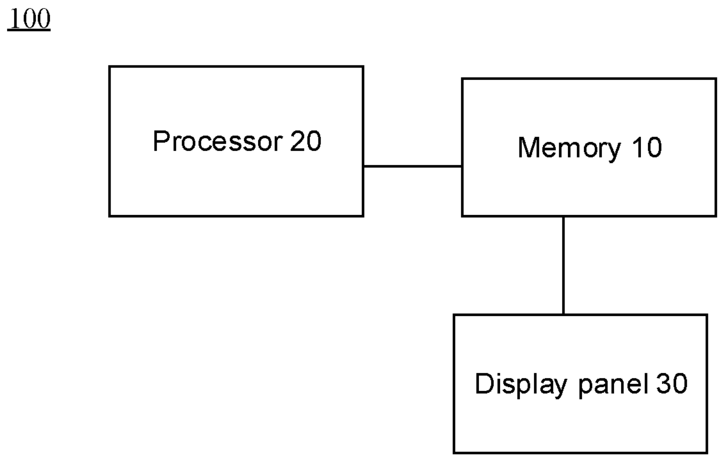
FIG. 1B is a block diagram of another display device, in accordance with some embodiments.

In some embodiments, as shown in FIGS. 1A and 1B, the display device 100 includes a memory 10 and a processor 20. The memory 10 is coupled to the processor 20.

In some examples, as shown in FIG. 1B, the display device 100 further includes a display panel 30. The display panel 30 includes a plurality of pixels, and each pixel includes at least three sub-pixels. Each pixel corresponds to a pixel value, when the display panel 30 displays an image, and the pixel value is obtained according to gray scale values of the at least three sub-pixels. For example, the at least three sub-pixels include three sub-pixels, and the three sub-pixels are a red sub-pixel, a green sub-pixel, and a blue sub-pixel. In this case, each pixel value is obtained according to a gray scale value of the red sub-pixel, a gray scale value of the green sub-pixel, and a gray scale value of the blue sub-pixel. For example, the pixel value of the pixel may be represented by RGB gray scale values. The memory 10 is configured to store a plurality of pixel values, e.g., RGB gray scale values of the plurality of pixels.

For example, the display device adopts a 10 bit image system. In this case, the sub-pixel is capable of displaying 1024 gray scales, and a value of a gray scale is in a range from 0 to 1023. The display device may present a white image with a maximum brightness when displaying a maximum gray scale.

Due to inherent physical characteristics of the display device, it is difficult to achieve a uniformity of luminous ratios of the three primary colors of red, green, and blue. As a result, the display device may not ensure a good color performance. Therefore, it is necessary to correct the color temperature of the display device before the display device leaves the factory.

However, if only a pixel value corresponding to the maximum display brightness (that is, the pixel value when displaying the white image with the maximum brightness is corrected, in order to have a good correction effect, the color temperature of the white image needs to be highly stable, which requires high demands on the display device. If the display of the display device is unstable, there is a correction deviation at a low brightness, which will affect the display effect.

Figure 2:
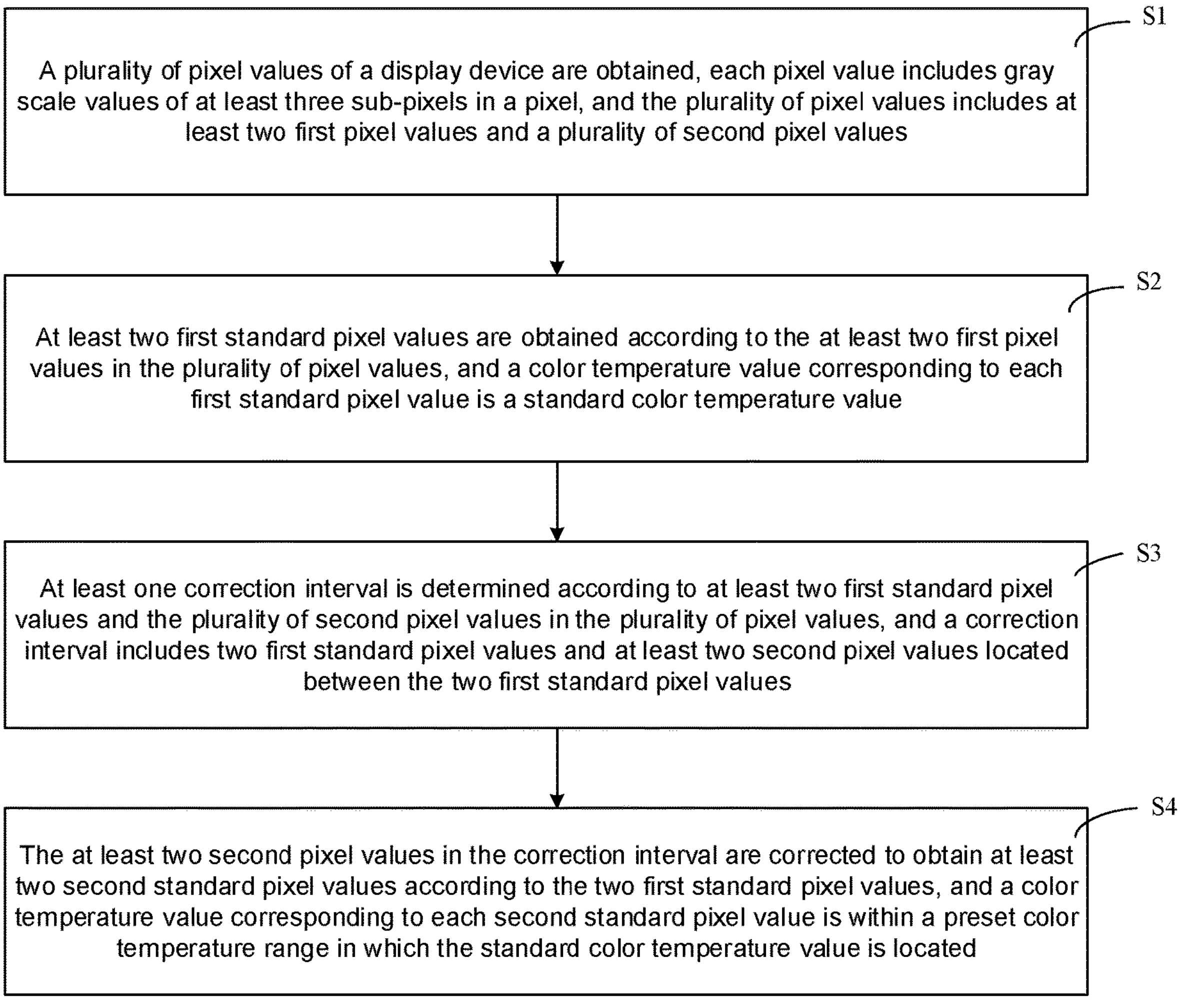
FIG. 2 is a flow diagram of a correction method for a color temperature curve, in accordance with some embodiments.

Some embodiments of the present disclosure provide a correction method for a color temperature curve. This method may be applied to the display device 100 and executed on the processor 20 in the display device 100. As shown in FIG. 2, the correction method includes the following steps 1 to 4 (S1 to S4).

In S1, a plurality of pixel values of the display device are obtained, each pixel value includes gray scale values of at least three sub-pixels in a pixel, and the plurality of pixel values include at least two first pixel values and a plurality of second pixel values.

In S2, at least two first standard pixel values are obtained according to the at least two first pixel values in the plurality of pixel values, and a color temperature value corresponding to each first standard pixel value is a standard color temperature value.

It will be noted that, the standard color temperature value may be preset according to actual needs, which is not limited in the embodiments of the present disclosure. For example, the standard color temperature value is 6500 K or 7000 K. The standard color temperature value may be pre-configured in the display device 100. For example, the memory 10 in the display device 100 stores the standard color temperature value.

Figure 3:
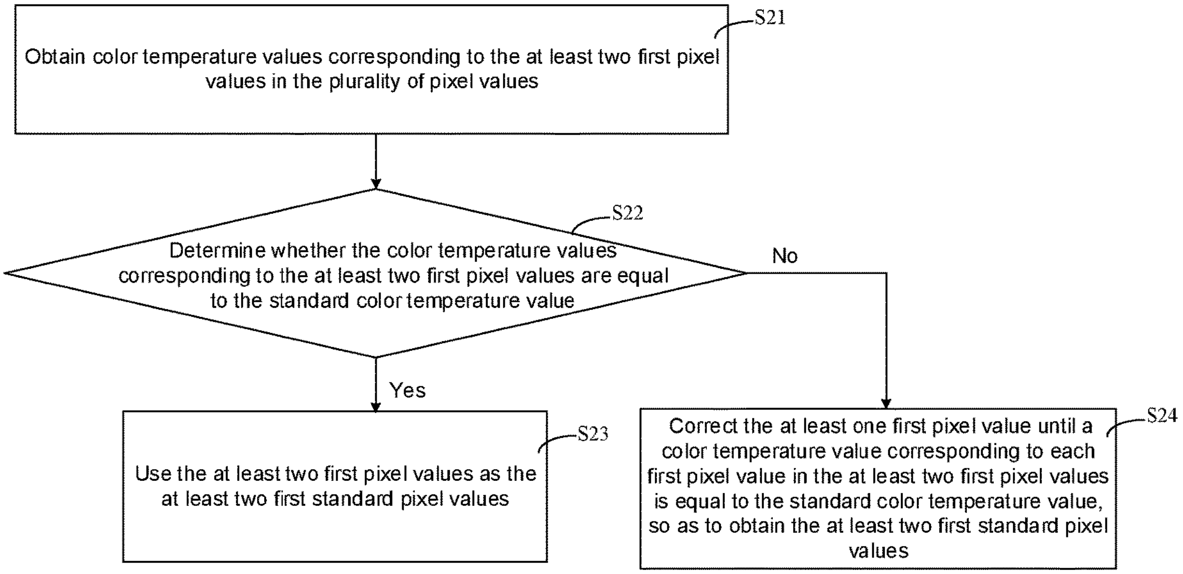
FIG. 3 is a flow diagram of another correction method for a color temperature curve, in accordance with some embodiments.

In some examples, as shown in FIG. 3, obtaining the at least two first standard pixel values according to the at least two first pixel values in the plurality of pixel values includes the following steps 21 to 24 (S21 to S24).

In S21, color temperature values corresponding to the at least two first pixel values in the plurality of pixel values are obtained.

For example, the display 30 displays an image according each of the at least two first pixel values, and an instrument (e.g., a color temperature meter) is used to measure color temperature of the image, so as to obtain a color temperature value corresponding to each first pixel value. The color temperature values corresponding to the at least two first pixel values may be stored in the memory 10. The processor 20 may obtain the color temperature values corresponding to the at least two first pixel values from the memory 10.

In S22, it is determined whether the color temperature values corresponding to the at least two first pixel values are equal to the standard color temperature value.

In S23, if the color temperature values corresponding to the at least two first pixel values are equal to the standard color temperature value, the at least two first pixel values are used as the at least two first standard pixel values.

In S24, if at least one color temperature value corresponding to at least one first pixel value is not equal to the standard color temperature value, the at least one first pixel value is corrected until the color temperature value corresponding to each first pixel value in the at least two first pixel values is equal to the standard color temperature value, so as to obtain the at least two first standard pixel values.

For example, the processor 20 is configured to: determine whether the color temperature value corresponding to each first pixel value in the at least two first pixel values is equal to the standard color temperature value; correct the first pixel value until the color temperature value corresponding to the first pixel value is equal to the standard color temperature value to obtain the first standard pixel value, in response to determining that the color temperature value is not equal to the standard color temperature value; use the first pixel value as the first standard pixel value, in response to determining that the color temperature value corresponding to the first pixel value is equal to the standard color temperature value; and store the first standard pixel value in the memory 10. The processor 20 may further store the first pixel value corresponding to the first standard pixel value in the memory 10.

In S3, at least one correction interval is determined according to the at least two first standard pixel values and the plurality of second pixel values in the plurality of pixel values, and a correction interval includes two first standard pixel values and at least two second pixel values located between the two first standard pixel values.

In some embodiments, the at least two first standard pixel values include N first standard pixel values, correction intervals are determined according to the N first standard pixel values and the plurality of second pixel values, and each correction interval includes two first standard pixel values and at least two second pixel values located between the two first standard pixel values. N is a positive integer greater 2. In some examples, the number of pixel values in the correction intervals is equal. In some other examples, the number of the pixel values in the correction intervals is not completely equal. For example, the number of the plurality of second pixel values in the correction intervals increases or decreases in a geometric sequence or an arithmetic sequence.

In S4, the at least two second pixel values in the correction interval are corrected to obtain at least two second standard pixel values according to the two first standard pixel values, and a color temperature value corresponding to each second standard pixel value is within a preset color temperature range in which the standard color temperature value is located.

It will be noted that, the preset color temperature range may be set according to actual needs, which is not limited here. For example, the standard color temperature value is 7000 K, and the preset color temperature range is from 6900 K to 7300 K.

Figure 9:
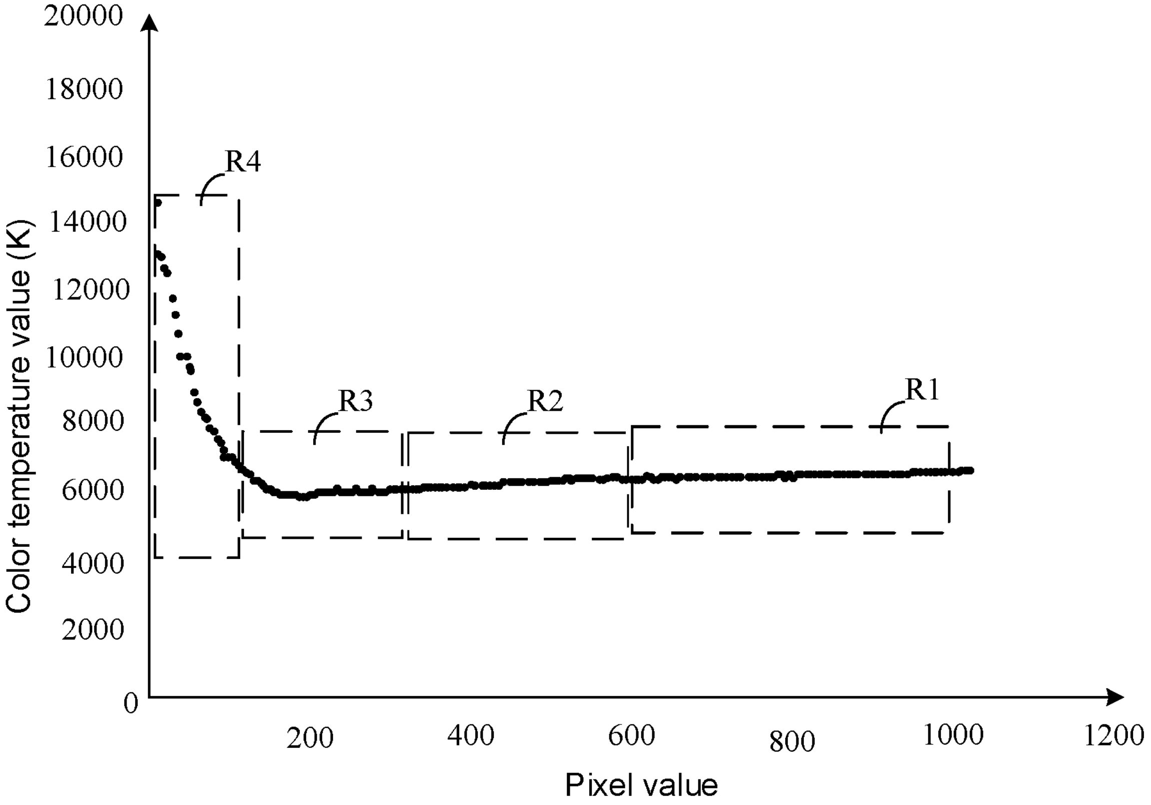
FIG. 9 is a graph of a color temperature curve to be corrected, in accordance with some embodiments.

FIG. 9 illustrates a color temperature curve to be corrected, where the ordinate represents a color temperature value, the abscissa represents a pixel value, and the pixel value is represented by a gray scale value of a pixel in which sub-pixels has a same gray scale value. For example, the sub-pixel in the display panel 30 is capable of displaying 1024 gray scales. As shown in FIG. 9, pixel values of 1000, 600, 300, 100, and 0 in the color temperature curve to be corrected are five first standard pixel values. Then, according to the five first standard pixel values, four correction intervals R1 to R4 are obtained, which are [1000, 600], [600, 300], [300, 100], and [100, 0], respectively. In this case, pixel values between 1000 and 600 are second pixel values in the correction interval R1; pixel values between 600 and 300 are second pixel values in the correction interval R2; pixel values between 300 and 100 are second pixel values in the correction interval R3; pixel values between 100 and 0 are second pixel values in the correction interval R4. For each correction interval, according to the two first standard pixel values, any second pixel value in the correction interval is corrected until the color temperature value corresponding to the corrected second pixel value is within the preset color temperature range, and the corrected second pixel value serves as the second standard pixel value. Based on this, a corrected color temperature curve is obtained.

For example, each first standard pixel value and the color temperature value (i.e., the standard color temperature value) corresponding thereto, and each second standard pixel value and the color temperature value corresponding thereto may be stored in the memory 10. The memory 10 may further store the first pixel value corresponding to the first standard pixel value, and the second pixel value corresponding to the second standard pixel value. According to each first standard pixel value and the color temperature value corresponding thereto, and each second standard pixel value and the color temperature value corresponding thereto, the corrected color temperature curve is obtained. In addition, the display panel 30 is configured to display an image according to each first standard pixel value and/or each second standard pixel value.

In the correction method for the color temperature curve provided in the embodiments of the present disclosure, at least one correction interval is determined according to the at least two first standard pixel values that are obtained according to the at least two first pixel values in the plurality of pixel values, then the second pixel value in the correction interval is corrected according to the two first standard pixel values in the correction interval to obtain the second standard pixel value, and thus the color temperature value corresponding to the pixel value in the correction interval is within the preset color temperature range. Compared with the case where only the pixel value corresponding to the maximum brightness is corrected, the embodiments of the present disclosure may independently correct pixel values. As a result, the color temperature value curve may be adjusted to a greater extent, and an accuracy of the color temperature correction is improved, thereby improving the display effect of the display device.

In some embodiments, before correcting the at least two second pixel values in the correction interval, it is determined whether color temperature values corresponding to the at least two second pixel values are within the preset color temperature range. If the color temperature values corresponding to the at least two second pixel values in the correction interval are within the preset color temperature range, the at least two second pixel values do not need to be corrected, and are directly used as the at least two second standard pixel values. If at least one color temperature value corresponding to at least one of the at least two second pixel values in the correction interval is not within the preset color temperature range, the at least one second pixel value needs to be corrected until the color temperature value corresponding to each corrected second pixel value is within the preset color temperature range. In this case, the corrected second pixel value serves as the second standard pixel value.

For example, a gray scale value of a red sub-pixel in a pixel, a gray scale value of a green sub-pixel in the pixel, and a gray scale value of a blue sub-pixel in the pixel are all 1000. In this case, a pixel value of the pixel is 1000. If the pixel value is a second pixel value, a color temperature value corresponding to the second pixel value is 5800K. In a case where the standard color temperature value is 7000 K and the preset color temperature range is [6900, 7300], the color temperature value corresponding to the second pixel value is not within the preset color temperature range, and the second pixel value needs to be corrected. After the second pixel value is corrected, the adjusted gray scale value of the red sub-pixel is 960, the adjusted gray scale value of the green sub-pixel is 1000, and the adjusted gray scale value of the blue sub-pixel is 1130, and a color temperature value corresponding to the corrected second pixel value is 7200 K, which is located in the preset color temperature range [6900, 7300]. Correspondingly, the corrected second pixel value is the second standard pixel value. In addition, the memory 10 stores the second standard pixel value and the color temperature value corresponding thereto. For example, the memory 10 stores RGB gray scale values (i.e., R is 960, G is 1000, and B is 1130), and the color temperature value (i.e., 7200 K) corresponding to RGB gray scale values.

In some embodiments, according to the two first standard pixel values and each of the at least two second pixel values in the correction interval, the second standard pixel value corresponding to the second pixel value is obtained through linear interpolation.

In some examples, the processor 20 is further configured to: obtain a correction parameter of each first standard pixel value; obtain an interpolation parameter of the second pixel value according to the two first standard pixel values and the second pixel value; and obtain the second standard pixel value corresponding to the second pixel value through the linear interpolation according to the correction parameters of the two first standard pixel values, the interpolation parameter of the second pixel value, and the second pixel value.

The correction parameter of the first standard pixel value is related to the first standard pixel value and the first pixel value corresponding to the first standard pixel value. For example, the correction parameter of the first standard pixel value is related to correction ratio coefficients of gray scale values in the first standard pixel value, and the interpolation parameter of the second pixel value is related to interpolation step-sizes of gray scale values in the second pixel value.

Figure 4:
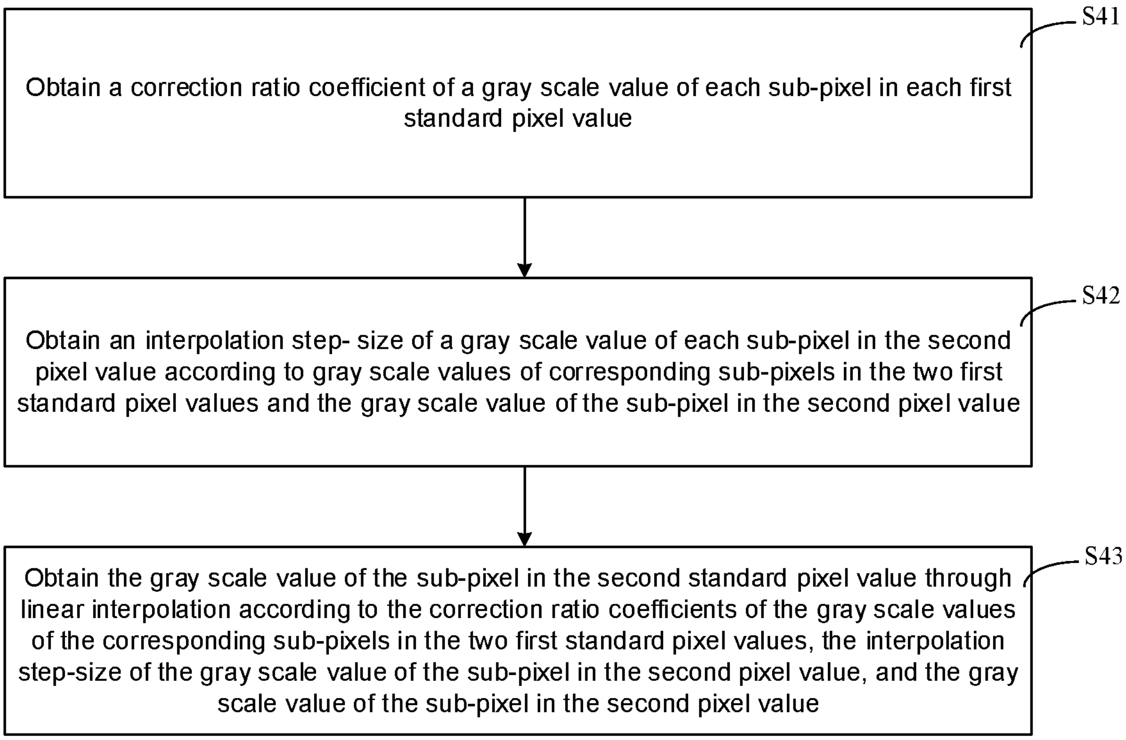
FIG. 4 is a flow diagram of yet another correction method for a color temperature curve, in accordance with some embodiments.

In some examples, as shown in FIG. 4, obtaining the second standard pixel value corresponding to the second pixel value through the linear interpolation according to the two first standard pixel values and each of the at least two second pixel values in the correction interval includes the following steps 41 to 43 (S41 to S43).

In S41, a correction ratio coefficient of a gray scale value of each sub-pixel in each first standard pixel value is obtained.

The correction ratio coefficient of the gray scale value of each sub-pixel in the first standard pixel value is related to a gray scale value of each sub-pixel in the first standard pixel value and a gray scale value of a corresponding sub-pixel in the first pixel value corresponding to the first standard pixel value.

For example, the correction ratio coefficient of the gray scale value of the sub-pixel in the first standard pixel value is obtained by calculating a ratio of the gray scale value of the sub-pixel in the first standard pixel value to the gray scale value of the sub-pixel in the first pixel value corresponding to the first standard pixel value.

In a case where each pixel value includes gray scale values of a red sub-pixel, a green sub-pixel and a blue sub-pixel, a correction ratio coefficient of a gray scale value of a red sub-pixel in the first standard pixel value is equal to a ratio of the gray scale value of the red sub-pixel in the first standard pixel value to a gray scale value of a red sub-pixel in the first pixel value corresponding to the first standard pixel value; a correction ratio coefficient of a gray scale value of a green sub-pixel in the first standard pixel value is equal to a ratio of the gray scale value of the green sub-pixel in the first standard pixel value to a gray scale value of a green sub-pixel in the first pixel value corresponding to the first standard pixel value; a correction ratio coefficient of a gray scale value of a blue sub-pixel in the first standard pixel value is equal to a ratio of the gray scale value of the blue sub-pixel in the first standard pixel value to a gray scale value of a blue sub-pixel in the first pixel value corresponding to the first standard pixel value.

In S42, an interpolation step-size of a gray scale value of each sub-pixel in the second pixel value is obtained according to gray scale values of the corresponding sub-pixels in the two first standard pixel values and the gray scale value of the sub-pixel in the second pixel value.

A specific value of the interpolation step-size and the color temperature value corresponding to the second pixel value are related to a magnitude of the standard color temperature value. For example, the processor 20 is configured to: obtain the color temperature value corresponding to the second pixel value; compare the color temperature value corresponding to the second pixel value with the standard color temperature value; set the interpolation step-size D of the gray scale value of the sub-pixel in the second pixel value to (Nsc−Npr)/(Nex−Npr) (i.e., D=(Nsc−Npr)/(Nex−Npr)), in response to determining that the color temperature value corresponding to the second pixel value is greater than the standard color temperature value; and set the interpolation step-size D of the gray scale value of the sub-pixel in the second pixel value to (Npr−Nsc)/(Nex−Npr) (i.e., D=(Npr−Nsc)/(Nex−Npr)), in response to determining that the color temperature value corresponding to the second pixel value is less than the standard color temperature value.

Here, D represents the interpolation step-size of the gray scale value of the sub-pixel in the second pixel value, and D is greater than or equal to 0 and less than or equal to 1 ($0 \le D \le 1$); Nsc represents the grayscale value of the sub-pixel in the second pixel value; Npr represents a gray scale value of the sub-pixel in a previous first standard pixel value (e.g., a smaller first standard pixel value) of the two first standard pixel values; Nex represents a gray scale value of the sub-pixel in a latter first standard pixel value (e.g., a larger first standard pixel value) of the two first standard pixel values.

In this way, in the case where the color temperature value corresponding to the second pixel value is greater than the standard color temperature value, an interpolation step-size D_R of the gray scale value of the red sub-pixel in the second pixel value satisfies a formula D_R=(Nsc_R−Npr_R)/(Nex_R−Npr_R), an interpolation step-size D_G of the gray scale value of the green sub-pixel in the second pixel value satisfies a formula D_G=(Nsc_G−Npr_G)/(Nex_G−Npr_G), and an interpolation step-size D_B of the gray scale value of the blue sub-pixel in the second pixel value satisfies a formula D_B=(Nsc_B−Npr_B)/(Nex_B−Npr_B). In the case where the color temperature value corresponding to the second pixel value is less than the standard color temperature value, the interpolation step-size D_R of the gray scale value of the red sub-pixel in the second pixel value satisfies a formula D_R=(Npr_R−Nsc_R)/(Nex_R−Npr_R), the interpolation step-size D_G of the gray scale value of the green sub-pixel in the second pixel value satisfies a formula D_G=(Npr_G−Nsc_G)/(Nex_G−Npr_G), and the interpolation step-size D_B of the gray scale value of the blue sub-pixel in the second pixel value satisfies a formula D_B=(Npr_B−Nsc_B)/(Nex_B−Npr_B). Here, Nsc_R, Nsc_G, and Nsc_B respectively represent the gray scale value of the red sub-pixel, the gray scale value of the green sub-pixel, and the gray scale value of the blue sub-pixel in the second pixel value; Npr_R, Npr_G, and Npr_B respectively represent the gray scale value of the red sub-pixel, the gray scale value of the green sub-pixel, and the gray scale value of the blue sub-pixel in the previous first standard pixel value (e.g., a smaller first standard pixel value) of the two first standard pixel values; Nex_R, Nex_G, and Nex_B respectively represent the gray scale value of the red sub-pixel, the gray scale value of the green sub-pixel; and the gray scale value of the blue sub-pixel in the latter first standard pixel value (e.g., a larger first standard pixel value) of the two first standard pixel values.

In S43, the gray scale value of the sub-pixel in the second standard pixel value is obtained through the linear interpolation according to the correction ratio coefficients of the gray scale values of the corresponding sub-pixels in the two first standard pixel values, the interpolation step-size of the gray scale value of the sub-pixel in the second pixel value, and the gray scale value of the sub-pixel in the second pixel value.

For example, the gray scale value of the sub-pixel in the second standard pixel value satisfies following formulas: Nsz=Drive_gain_Ns×Nsc; and Drive_gain_Ns=Drive_gain_Nex+(1−D)×Drive_gain_Npr. Here, Nsz represents the gray scale value of the sub-pixel in the second standard pixel value; Drive_gain_Ns represents a correction ratio coefficient of the gray scale value of the sub-pixel in the second standard pixel value; Drive_gain_Nex represents the correction ratio coefficient of the gray scale value of the corresponding sub-pixel in the latter first standard pixel value (e.g., the larger first standard pixel value) of the two first standard pixel values; and Drive_gain_Npr represents the correction ratio coefficient of the gray scale value of the corresponding sub-pixel in the previous first standard pixel value (e.g., the smaller first standard pixel value) of the two first standard pixel values.

In this case, the gray scale value of the red sub-pixel in the second standard pixel value satisfies the formula: Nsz_R=Drive_gain_Ns_R×Nsc_R; and Drive_gain_Ns_R=Drive_gain_Nex_R+(1−D_R)×Drive_gain_Npr_R. Here, Nsz_R represents the gray scale value of the red sub-pixel in the second standard pixel value; Drive_gain_Ns_R represents the correction ratio coefficient of the gray scale value of the red sub-pixel in the second standard pixel value; Drive_gain_Nex_R represents the correction ratio coefficient of the gray scale value of the red sub-pixel in the latter first standard pixel value (e.g., the larger first standard pixel value) of the two first standard pixel values; and Drive_gain_Npr_R represents the correction ratio coefficient of the gray scale value of the red sub-pixel in the previous first standard pixel value (e.g., the smaller first standard pixel value) of the two first standard pixel values.

The gray scale value of the green sub-pixel in the second standard pixel value satisfies the formula: Nsz_G=Drive_gain_Ns_G×Nsc_G; and Drive_gain_Ns_G=Drive_gain_Nex_G+(1−D_G)×Drive_gain_Npr_G. Here, Nsz_G represents the gray scale value of the green sub-pixel in the second standard pixel value; Drive_gain_Ns_G represents the correction ratio coefficient of the gray scale value of the green sub-pixel in the second standard pixel value; Drive_gain_Nex_G represents the correction ratio coefficient of the gray scale value of the green sub-pixel in the latter first standard pixel value (e.g., the larger first standard pixel value) of the two first standard pixel values; and Drive_gain_Npr_G represents the correction ratio coefficient of the gray scale value of the green sub-pixel in the previous first standard pixel value (e.g., the smaller first standard pixel value) of the two first standard pixel values.

The gray scale value of the blue sub-pixel in the second standard pixel value satisfies the formula: Nsz_B=Drive_gain_Ns_B×Nsc_B; and Drive_gain_Ns_B=Drive_gain_Nex_B+(1−D_B)×Drive_gain_Npr_B. Here, Nsz_B represents the gray scale value of the blue sub-pixel in the second standard pixel value; Drive_gain_Ns_B represents the correction ratio coefficient of the gray scale value of the blue sub-pixel in the second standard pixel value; Drive_gain_Nex_B represents the correction ratio coefficient of the gray scale value of the blue sub-pixel in the latter first standard pixel value (e.g., the larger first standard pixel value) of the two first standard pixel values; and Drive_gain_Npr_B represents the correction ratio coefficient of the gray scale value of the blue sub-pixel in the previous first standard pixel value (e.g., the smaller first standard pixel value) of the two first standard pixel values.

Figure 5:
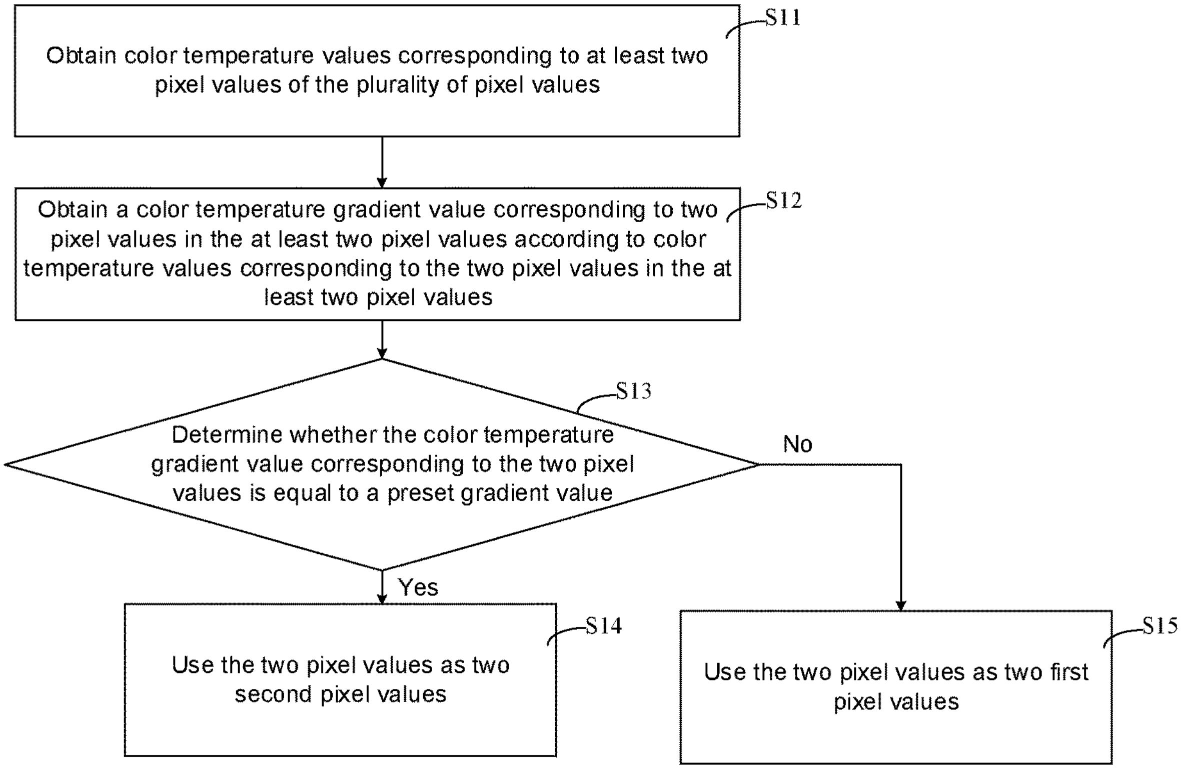
FIG. 5 is a flow diagram of yet another correction method for a color temperature curve, in accordance with some embodiments.

In some examples, as shown in FIG. 5, obtaining the plurality of pixel values includes the following steps 11 to 15 (S11 to S15).

In S11, color temperature values corresponding to at least two pixel values of the plurality of pixel values are obtained.

It will be noted that S11 can refer to the description of S21 above, and details will not be repeated here.

In S12, a color temperature gradient value corresponding to two pixel values in the at least two pixel values is obtained according to color temperature values corresponding to the two pixel values in the at least two pixel values.

For example, the color temperature gradient value corresponding to the two pixel values may be obtained according to a formula $$G_x = \frac{T_1 - T_2}{M + 1}.$$

Here, $G_X$ represents the color temperature gradient value corresponding to the two pixel values, $T_1$ represents the color temperature corresponding to the latter pixel value (e.g., the larger pixel value) of the two pixel values, $T_2$ represents the color temperature corresponding to the previous pixel value (e.g., the smaller pixel value) of the two pixel values, M represents the number of pixel values between the two pixel values, and M is a positive integer.

For example, a previous pixel value is 300, a latter pixel value is 600, and the number of pixel values between the two pixel values 300 and 600 is 299, i.e., M is equal to 299. In this case, a color temperature gradient value $G_1$ corresponding to the two pixel values 300 and 600 is $$\frac{T_{600} - T_{300}}{300},$$

where $T_{300}$ is a color temperature corresponding to the previous pixel value 300, and $T_{600}$ is a color temperature corresponding to the latter pixel value 600.

In S13, it is determined whether the color temperature gradient value corresponding to the two pixel values is equal to a preset gradient value.

It will be noted that, the preset gradient value may be set according to actual needs, which is not limited here. For example, the preset gradient value is 200. The preset gradient value may be pre-configured in the display device 100. For example, the preset gradient value is pre-stored in the memory 10.

In S14, if the color temperature gradient value corresponding to the two pixel values is equal to the preset gradient value, the two pixel values are used as two second pixel values.

In S15, if the color temperature gradient value corresponding to the two pixel values is not equal to the preset gradient value, the two pixel values are used as two first pixel values.

In the case where the color temperature gradient value corresponding to the two pixel values is not equal to (i.e., greater than or less than) the preset gradient value, a difference between the color temperature values corresponding to the two pixel values is large, and thus a deviation of a color temperature corresponding to a pixel value between the two pixel values is large. In this case, the two pixel values are used as two first pixel values to obtain two first standard pixel values, and based on the first standard pixel value corresponding to the two pixel values, the pixel value (i.e., the second pixel value) between the two pixel values are corrected.

In the case where the color temperature gradient value corresponding to the two pixel values is equal to the preset gradient value, the difference between the color temperature values corresponding to the two pixel values is relatively small, and thus the deviation of color temperature corresponding to the pixel value between the two pixel values is small. In this case, the two pixel values are not used as the two first pixel values.

In some examples, a correction interval with a large variation range of color temperature values may be divided more finely to reduce the number of second pixel values in each correction interval. For example, at least one pixel value between the two first pixel values may be used as first pixel value(s), so as to obtain more correction intervals. In this way, it is possible to reduce a deviation of the correction of each second pixel value, so that the second pixel value may be corrected finely, a more accurate second standard pixel value may be obtained, and in turn, the accuracy of the correction for the color temperature curve is improved. In some other examples, a correction interval determined by two first pixel values with a small variation range of color temperature values may not be divided more finely, and thus the difficulty of data processing during the correction may be reduced, thereby improving the efficiency of the correction for the color temperature curve.

In some embodiments, after obtaining at least two second standard pixel values, a deviation value between a color temperature value corresponding to each of the at least two second standard pixel values in the correction interval and the standard color temperature value is obtained. Then, it is determined whether the deviation value between the color temperature value corresponding to each second standard pixel value in the correction interval and the standard color temperature value is greater than a preset deviation value; and if the deviation value between the color temperature value corresponding to the second standard pixel value and the standard color temperature value is greater than the preset deviation value, the second standard pixel value will be re-corrected until a deviation value between a color temperature value corresponding to a re-corrected second standard pixel value and the standard color temperature value is less than or equal to the preset deviation value.

For example, after each second standard pixel value is obtained, a deviation value (e.g., an error) between the color temperature value corresponding to the second standard pixel value and the standard color temperature value is obtained. If the deviation value is greater than the preset deviation value, the second standard pixel value needs to be re-corrected until the deviation value between the color temperature value corresponding to the re-corrected second standard pixel value and the standard color temperature value is less than or equal to the preset deviation value. In this way, an error of the correction result may be reduced, thereby improving the accuracy of the corrected color temperature curve.

Figure 6:
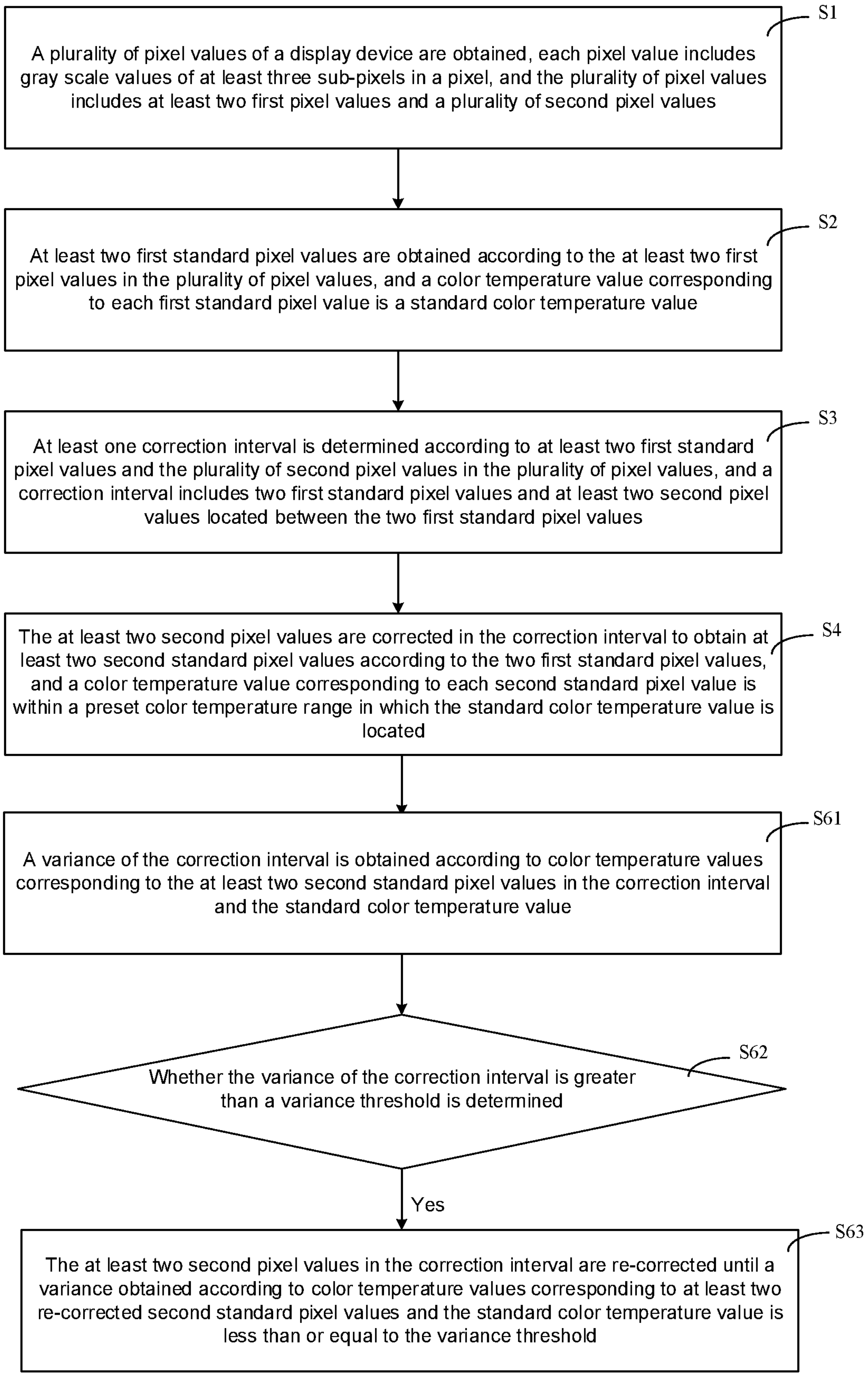
FIG. 6 is a flow diagram of yet another correction method for a color temperature curve, in accordance with some embodiments.

In some embodiments, as shown in FIG. 6, after obtaining at least two second standard pixel values, the correction method further includes the following steps 61 to 63 (S61 to S63).

In S61, a variance of the correction interval is obtained according to the color temperature values corresponding to the at least two second standard pixel values in the correction interval and the standard color temperature value.

In S62, it is determined whether the variance of the correction interval is greater than a variance threshold.

In S63, if the variance of the correction interval is greater than the variance threshold, the at least two second standard pixel values in the correction interval are re-corrected until a variance obtained according to color temperature values corresponding to at least two re-corrected second standard pixel values and the standard color temperature value is less than or equal to the variance threshold.

For example, the variance $S^2$ of the correction interval is calculated according to a formula $$S^2 = \frac{\sum_{i=1}^{m} (K_i - U)^2}{F}.$$

Here, F is the number of at least two second standard pixel values in the correction interval, $K_i$ is a difference between a color temperature value corresponding to an i-th second standard pixel value in the correction interval and the standard color temperature value, and U is an average value of the differences between the color temperature values corresponding to the at least two second standard pixel values in the correction interval and the standard color temperature value.

It will be noted that, the variance threshold may be set according to actual needs, which is not limited here.

In a case where the variance is greater than the variance threshold, the differences between the color temperature values corresponding to the at least two second standard pixel values in the correction interval and the standard color temperature value fluctuates greatly, and thus the at least two second pixel values corresponding to the at least two second standard pixel values in the correction interval need to be re-corrected until the variance obtained according to the corrected color temperature values corresponding to at least two new second standard pixel values and the standard color temperature values is less than or equal to the variance threshold. In this way, the fluctuation of the differences between the color temperature values corresponding to the at least two second standard pixel values in the correction interval and the standard color temperature value is reduced, thereby improving the accuracy of the correction of second pixel values in the correction interval.

If the variance is less than or equal to the variance threshold, it is not necessary to re-correct the at least two second pixel values corresponding to the at least two second standard pixel values in the correction interval. The memory 10 may store the at least two second standard pixel values.

Figure 7:
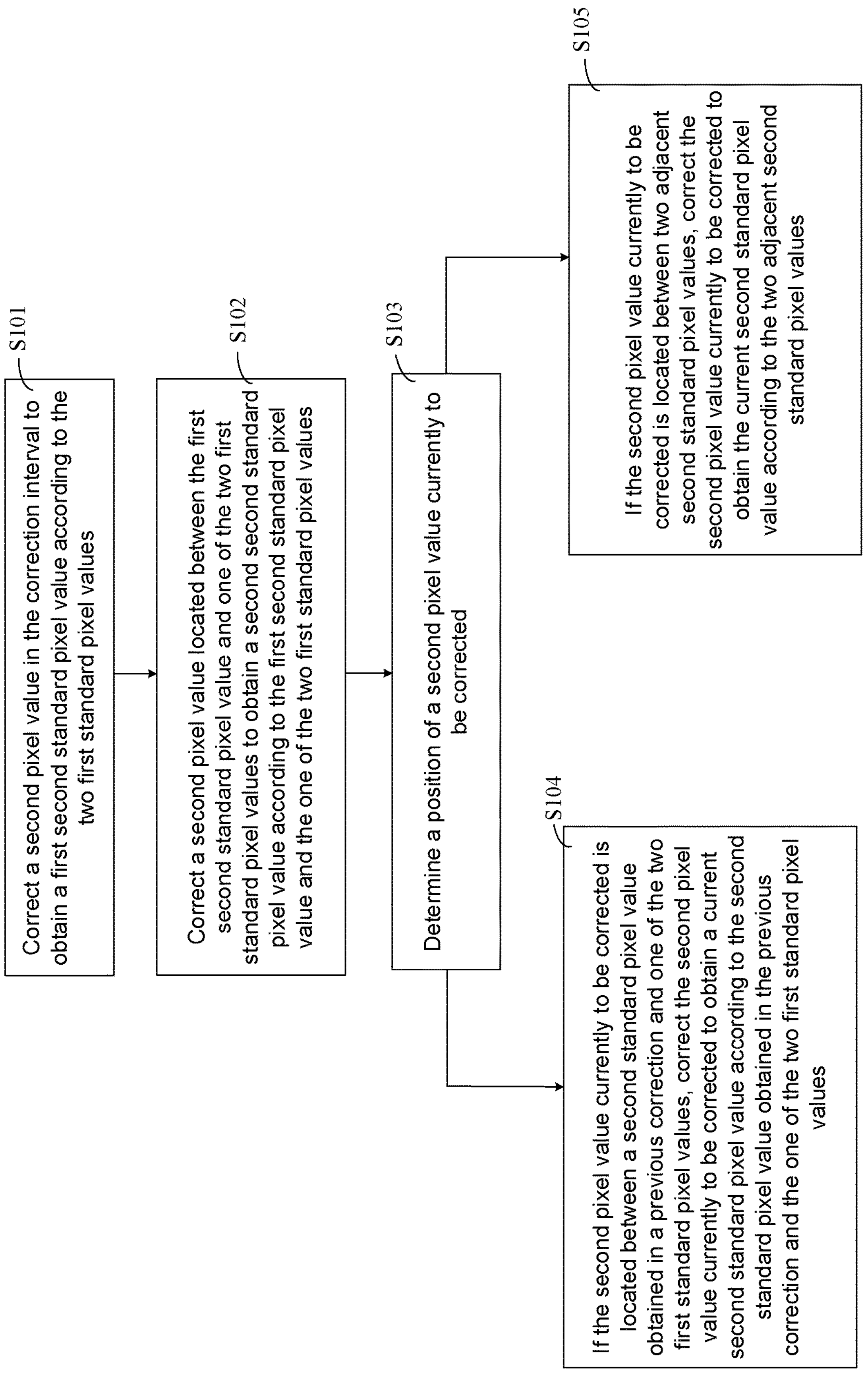
FIG. 7 is a flow diagram of yet another correction method for a color temperature curve, in accordance with some embodiments.

In some embodiments, the at least two second pixel values in the correction interval include at least three second pixel values, for example, three or more second pixel values. As shown in FIG. 7, correcting at least three second pixel values includes the following steps 101 to 105 (S101 to S105).

In S101, a second pixel value in the correction interval is corrected to obtain a first second standard pixel value according to the two first standard pixel values.

For example, the plurality of pixel values are Q0 to Q1023, one correction interval is [Q100, Q600], two first pixel values in the correction interval are Q100 and Q600. Two first standard pixel values corresponding to the two first pixel values Q100 and Q600 are respectively QS100 and QS600, the first standard pixel value QS100 is the previous first standard pixel value of the two first standard pixel values, and the first standard pixel value QS600 is the latter first standard pixel value of the two first standard pixel values. A second pixel value Q300 in the correction interval [Q100, Q600] is corrected to obtain a second standard pixel value QS300, and the second standard pixel value QS300 is the first second standard pixel value.

In S102, a second pixel value, located between the first second standard pixel value and one of the two first standard pixel values, is corrected to obtain a second second standard pixel value according to the first second standard pixel value and the one of the two first standard pixel values.

For example, according to the first standard pixel value QS100 and the first second standard pixel value QS300, a second pixel value Q200 between the first standard pixel value QS100 and the first second standard pixel value QS300 is corrected. That is, the second pixel value Q200 between the first pixel value Q100 and the second pixel value Q300 is corrected to obtain a second standard pixel value QS200. In this case, the second standard pixel value QS200 is the second second standard pixel value.

For another example, according to the first standard pixel value QS600 and the first second standard pixel value QS300, a second pixel value Q500 between the first standard pixel value QS600 and the first second standard pixel value QS300 is corrected. That is, the second pixel value Q500 between the first pixel value Q600 and the second pixel value Q300 is corrected to obtain a second standard pixel value QS500. In this case, the second standard pixel value QS500 is the second second standard pixel value.

Then, S103 to S105 are performed at least once, such as once, twice or more times.

In S103, a position of a second pixel value currently to be corrected is determined.

In S104, if the second pixel value currently to be corrected is located between a second standard pixel value obtained in a previous correction and one of the two first standard pixel values, the second pixel value currently to be corrected is corrected to obtain a current second standard pixel value according to the second standard pixel value obtained in the previous correction and the one of the two first standard pixel values.

In S105, if the second pixel value currently to be corrected is located between two adjacent second standard pixel values, the second pixel value currently to be corrected is corrected to obtain the current second standard pixel value according to the two adjacent second standard pixel values.

For example, the second standard pixel value QS200 is the second standard pixel value obtained in the previous correction, and a second pixel value Q150 is the second pixel value currently to be corrected. The second pixel value currently to be corrected Q150 is located between the first pixel value Q100 and the second pixel value Q200 in the previous correction, that is, the second pixel value currently to be corrected Q150 is located between the first standard pixel value QS100 and the second standard pixel value QS200 obtained in the previous correction. Therefore, according to the first standard pixel value QS100 and the second standard pixel value QS200 obtained in the previous correction, the second pixel value currently to be corrected Q150 is corrected to obtain a current second standard pixel value QS150.

For another example, the second standard pixel value QS200 is the second standard pixel value obtained in the previous correction, and a second pixel value Q250 is the second pixel value currently to be corrected. The second pixel value currently to be corrected Q250 is located between two adjacent second pixel values Q300 and Q200, that is, the second pixel value currently to be corrected Q250 is located between two adjacent second standard pixel values QS300 and QS200. Therefore, according to two adjacent second standard pixel values QS300 and QS200, the second pixel value currently to be corrected Q250 is corrected to obtain a current second standard pixel value QS250.

Therefore, after the first second standard pixel value is obtained, at least one of two first standard pixel values in the correction interval in which the second pixel value to be corrected is located is updated to at least one second standard pixel value. In this way, the first standard pixel value based on which the second pixel value to be corrected is corrected is updated in each correction process, so that the error of the correction may be reduced, thereby improving the accuracy of the correction.

Figure 8:
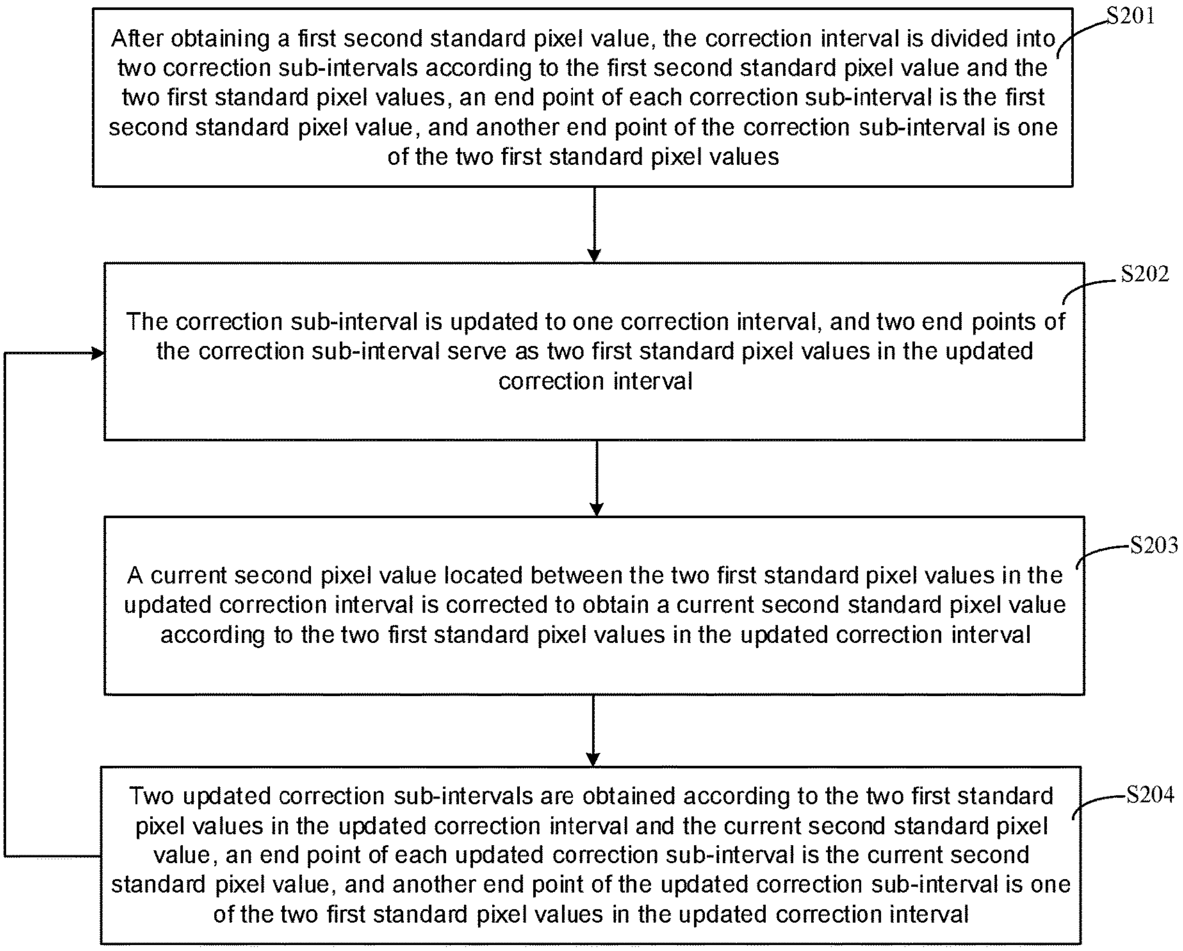
FIG. 8 is a flow diagram of yet another correction method for a color temperature curve, in accordance with some embodiments.

In some embodiments, as shown in FIG. 8, the correction method further includes the following steps 201 to S204 (S201~S204).

In S201, after obtaining the first second standard pixel value, the correction interval is divided into two correction sub-intervals according to the first second standard pixel value and the two first standard pixel values; and an end point of each correction sub-interval is the first second standard pixel value, and another end point of the correction sub-interval is one of the two first standard pixel values.

For example, for the above correction interval [Q100, Q600], after the first second standard pixel value QS300 is obtained, the correction interval [Q100, Q600] is divided into two correction sub-intervals [QS100, QS300] and [QS300, QS600]. An end point of the correction sub-interval [QS100, QS300] and an end point of the correction sub-interval [QS300, QS600] are both the first second standard pixel value QS300, another end point of the correction sub-interval [QS100, QS300] is the first standard pixel value QS100, and another end point of the correction sub-interval [QS300, QS600] is the first standard pixel value QS600.

Then, S202 to S204 are performed at least once, such as once, twice or more times.

In S202, the correction sub-interval is updated to one correction interval, and two end points of the correction sub-interval serve as two first standard pixel values in the updated correction interval.

For example, the correction sub-interval [QS100, QS300] is updated to a correction interval, two first standard pixel values in the correction interval are two end points QS100 and QS300 of the correction sub-interval [QS100, QS300]; another correction sub-interval [QS300, QS600] is updated to another correction interval, two first standard pixel values of the another correction interval are two end points QS300 and QS600 of the another correction sub-interval [QS300, QS600].

In S203, a current second pixel value located between the two first standard pixel values in the updated correction interval is corrected to obtain a current second standard pixel value according to the two first standard pixel values in the updated correction interval.

For example, for the updated correction interval [QS100, QS300], according to the two first standard pixel values QS100 and QS300, a current second pixel value Q200, located between the two first standard pixel values QS100 and QS300, i.e., located between the two first pixel values Q100 and Q300, is corrected to obtain a current second standard pixel value QS200. For another example, for the another updated correction interval [QS300, QS600], according to two first standard pixel values QS300 and QS600, a current second pixel value Q500, located between the two first standard pixel values QS300 and QS600, i.e., located between the two first pixel values Q300 and Q600, is corrected to obtain a current second standard pixel value QS500.

In S204, two updated correction sub-intervals are obtained according to the two first standard pixel values in the updated correction interval and the current second standard pixel value; an end point of each updated correction sub-interval is the current second standard pixel value, and another end point of the updated correction sub-interval is one of the two first standard pixel values in the updated correction interval.

For example, according to the two first standard pixel values QS100 and QS300 of the updated correction interval [QS100, QS300], and the current second standard pixel value QS200, two updated correction sub-intervals [QS100, QS200] and [QS200, QS300] are obtained; then, S202 is performed again. That is, the updated correction sub-interval [QS100, QS200] is updated to an updated correction interval, and two first standard pixel values in the updated correction interval are QS100 and QS200; and the updated correction sub-interval [QS200, QS300] is updated to another updated correction interval, and two first standard pixel values of the another updated correction interval are QS200 and QS300. For another example, according to the two first standard pixel values QS300 and QS600 in the updated correction interval [QS300, QS600], and the current second standard pixel value QS500, two updated correction sub-intervals [QS300, QS500] and [QS500, QS600] are obtained; then, S202 is performed again. That is, the updated correction sub-interval [QS300, QS500] is updated to an updated correction interval, and two first standard pixel values in the updated correction interval are QS300 and QS500; and the updated correction sub-interval [QS500, QS600] is updated to another updated correction interval, and two first standard pixel values of the another updated correction interval are QS500 and QS600. After S202 is performed, S203 is performed again. That is, according to two first standard pixel values in the updated correction interval, a second pixel value in the updated correction interval is corrected.

In this way, after each correction, the correction interval may be divided again, so as to refine the correction interval. Therefore, the number of second pixel values to be corrected in the correction interval is reduced, and a time for data processing is shortened, thereby improving a correction efficiency of the color temperature curve.

In some embodiments, referring to FIGS. 1A and 1B, in the display device 100 provided in the embodiments of the present disclosure, the memory 10 is configured to store one or more computer programs. The processor 20 is configured to execute the one or more computer programs to implement the correction method for the color temperature curve described in any one of the above embodiments, for example, to implement one or more steps in the correction method for the color temperature curve.

The beneficial effects of the above display device are the same as the beneficial effects of the correction method for the color temperature curve described in some of the above embodiments, which will not be repeated here.

The display device may further include other components, such as an input-output component, a network access component, a bus, and so on.

The processor 20 may be a central processing unit (CPU), a microprocessor, a general purpose processor, a digital signal processor (DSP), an application specific integrated circuit (ASIC), a programmable logic device (such as a field programmable gate array (FPGA)), a discrete gate, a transistor logic device, a discrete hardware component, etc. For example, the processor 20 is connected to components of the display device 100 through interfaces or lines, so as to control the components connected to the processor 20.

The memory 10 stores the computer program(s). The processor 20 executes the computer program(s) stored in the memory 10 and obtains data stored in the memory 10. In addition, the memory 10 may include a high-speed random access memory, and may further include any non-volatile memory, such as hard disk, memory, plug-in hard disk, smart media card (SMC), secure digital (SD) card, flash card, at least one disk storage device, flash memory device, or any other volatile solid-state storage device.

Some embodiments of the present disclosure provide a non-transitory computer-readable storage medium that stores one or more computer programs. When the one or more computer programs are executed by the processor, the processor implements the correction method for the color temperature curve as described in any of the above embodiments. For example, the processor may implement one or more steps in the correction method.

For example, the non-transitory computer-readable storage medium may include, but is not limited to a magnetic storage device (e.g., a hard disk, a floppy disk or a tape), an optical disk (e.g., a compact disk (CD), a digital versatile disk (DVD)), a smart card and a flash memory device (e.g., an erasable programmable read-only memory (EPROM), a card, a stick or a key drive). Various non-transitory computer-readable storage medium described may represent one or more devices, and/or other machine-readable storage media for storing information.

Some embodiments of the present disclosure further provide a computer program product. The computer program product includes one or more computer programs stored on the non-transitory computer-readable storage medium. When executed on the processor, the one or more computer programs enable the processor to implement the correction method for the color temperature curve as described in the above embodiments, for example, one or more steps in the correction method.

The beneficial effects of the foregoing non-transitory computer-readable storage medium and computer program product are the same as the beneficial effects of the correction method for the color temperature curve described in any of the above embodiments, which will not be repeated here.

The foregoing descriptions are merely specific implementations of the present disclosure, but the protection scope of the present disclosure is not limited thereto. Changes or replacements that any person skilled in the art could conceive of within the technical scope of the present disclosure shall all be included in the protection scope of the present disclosure. Therefore, the protection scope of the present disclosure shall be subject to the protection scope of the claims.

What is claimed is:

1. A correction method for a color temperature curve, comprising:

obtaining a plurality of pixel values of a display device, wherein each pixel value includes gray scale values of at least three sub-pixels in a pixel, and the plurality of pixel values include at least two fir pixel values and a plurality of second pixel values;

obtaining at least two first standard pixel values according to the at least two first pixel values, wherein a color temperature value corresponding to each first standard pixel value is a standard color temperature value;

determining at least one correction interval according to the at least two first standard pixel values and the plurality of second pixel values, wherein a correction interval includes two first standard pixel values and at least two second pixel values therebetween; and correcting the at least two second pixel values in the correction interval to obtain at least two second standard pixel values according to the two first standard pixel values, wherein a color temperature value corresponding to each second standard pixel value is within a preset color temperature range in which the standard color temperature value is located;

wherein obtaining the at least two first standard pixel values according to the at least two first pixel values, includes:

obtaining color temperature values corresponding to the at least two first pixel values;

determining whether the color temperature values corresponding to the at least two first pixel values are equal to the standard color temperature value;

using the at least two first pixel values as the at least two first standard pixel values, in response to determining that the color temperature values corresponding to the at least two first pixel values are equal to the standard color temperature value; and correcting at least one first pixel value until a color temperature value corresponding to each first pixel value in the at least two first pixel values is equal to the standard color temperature value, in response to determining that at least one color temperature value corresponding to the at least one first pixel value is not equal to the standard color temperature value, so that the at least two first standard pixel values are obtained;

wherein correcting the at least two second pixel values in the correction interval to obtain the at least two second standard pixel values according to the two first standard pixel values, includes:

obtaining a second standard pixel value corresponding to each of the at least two second pixel values in the correction interval through linear interpolation according to the two first standard pixel values and each of the at least two second pixel values;

wherein obtaining the second standard pixel value corresponding to each of the at least two second pixel values in the correction interval through the linear interpolation according to the two first standard pixel values and each of the at least two second pixel values, includes:

obtaining a correction ratio coefficient of a gray scale value of each sub-pixel in each first standard pixel value, wherein the correction ratio coefficient of the gray scale value of each sub-pixel in the first standard pixel value is related to a gray scale value of each sub-pixel in the first standard pixel value and a gray scale value of a corresponding sub-pixel in the first pixel value corresponding to the first standard pixel value;

obtaining an interpolation step-size of a gray scale value of each sub-pixel in the second pixel value according to gray scale values of corresponding sub-pixels in the two first standard pixel values and the gray scale value of the sub-pixel in the second pixel value; and obtaining the gray scale value of the sub-pixel in the second standard pixel value through the linear interpolation according to correction ratio coefficients of the gray scale values of the corresponding sub-pixels in the two first standard pixel values, the interpolation step-size of the gray scale value of the sub-pixel in the second pixel value, and the gray scale value of the sub-pixel in the second pixel value;

wherein the gray scale value of the sub-pixel in the second standard pixel value satisfies following formulas:

$Nsz=Drive\_gain\_Ns \times Nsc$, and $Drive\_gain\_Ns=Drive\_gain\_Nex+(1-D)-Drive\_gain\_Npr$, wherein D represents the interpolation step-size of the gray scale value of the sub-pixel in the second pixel value, and D is greater than or equal to 0 and less than or equal to 1; Nsz represents the gray scale value of the sub-pixel in the second standard pixel value; Nsc represents the gray scale value of the sub-pixel in the second pixel value; Drive_gain_Ns represents a correction ratio coefficient of the gray scale value of the sub-pixel in the second standard pixel value; Drive_gain_Nex represents the correction ratio coefficient of the gray scale value of the sub-pixel in a latter first standard pixel value of the two first standard pixel values; Drive_gain_Npr represents the correction ratio coefficient of the gray scale value of the sub-pixel in a previous first standard pixel value of the two first standard pixel values.

2. A The correction method according to claim 1, wherein obtaining the second standard pixel value corresponding to each of the at least two second pixel values in the correction interval through the linear interpolation according to the two first standard pixel values and each of the at least two second pixel values, includes:

obtaining a correction parameter of each first standard pixel value, wherein the correction parameter of the first standard pixel value is related to the first standard pixel value and a first pixel value corresponding to the first standard pixel value;

obtaining an interpolation parameter of the second pixel value according to the two first standard pixel values and the second pixel value; and obtaining the second standard pixel value corresponding to the second pixel value through the linear interpolation according to correction parameters of the two first standard pixel values, the interpolation parameter of the second pixel value, and the second pixel value.

3. The correction method according to claim 1, wherein obtaining the interpolation step-size of the gray scale value of the sub-pixel in the second pixel value according to the gray scale values of the corresponding sub-pixels in the two first standard pixel values and the gray scale value of the sub-pixel in the second pixel value, includes:

obtaining a color temperature value corresponding to the second pixel value;

comparing the color temperature value corresponding to the second pixel value with the standard color temperature value;

set the interpolation step-size of the gray scale value of the sub-pixel in the second pixel value to (Nsc−Npr)/(Nex−Npr), in response to determining that the color temperature value corresponding to the second pixel value is greater than the standard color temperature value; and set the interpolation step-size of the gray scale value of the sub-pixel in the second pixel value to (Npr−Nsc)/(Nex−Npr), in response to determining that the color temperature value corresponding to the second pixel value is less than the standard color temperature value, wherein Nsc represents the gray scale value of the sub-pixel in the second pixel value; Npr represents a gray scale value of a corresponding sub-pixel in a previous first standard pixel value of the two first standard pixel values; Nex represents a gray scale value of a corresponding sub-pixel in a latter first standard pixel value of the two first standard pixel values.

4. The correction method according to claim 1, wherein obtaining the correction ratio coefficient of the gray scale value of each sub-pixel in each first standard pixel value, includes:

calculating a ratio of the gray scale value of the sub-pixel in the first standard pixel value to the gray scale value of the sub-pixel in the first pixel value corresponding to the first standard pixel value, so that the correction ratio coefficient of the gray scale value of the sub-pixel in the first standard pixel value is obtained.

5. The correction method according to claim 1, wherein obtaining the plurality of pixel values, includes:

obtaining color temperature values corresponding to at least two pixel values of the plurality of pixel values;

obtaining a color temperature gradient value corresponding to two pixel values in the at least two pixel values according to color temperature values corresponding to the two pixel values in the at least two pixel values;

determining whether the color temperature gradient value corresponding to the two pixel values is equal to a preset gradient value;

using the two pixel values as two second pixel values, in response to determining that the color temperature gradient value corresponding to the two pixel values is equal to the preset gradient value; and using the two pixel values as two first pixel values, in response to determining that the color temperature gradient value corresponding to the two pixel values is not equal to the preset gradient value.

6. The correction method according to claim 1, wherein the at least two second pixel values in the correction interval include at least three second pixel values; and correcting the at least three second pixel values, includes:

correcting a second pixel value in the correction interval to obtain a first second standard pixel value according to the two first standard pixel values;

correcting a second pixel value located between the first second standard pixel value and one of the two first standard pixel values to obtain a second second standard pixel value according to the first second standard pixel value and the one first standard pixel value; and performing following operations at least once:

determining a position of a second pixel value currently to be corrected;

correcting the second pixel value currently to be corrected to obtain a current second standard pixel value according to the second standard pixel value obtained in a previous correction and one of the two first standard pixel values, in response to determining that the second pixel value currently to be corrected is located between the second standard pixel value obtained in the previous correction and the one first standard pixel value; and correcting the second pixel value currently to be corrected to obtain the current second standard pixel value according to two adjacent second standard pixel values, in response to determining that the second pixel value currently to be corrected is located between the two adjacent second standard pixel values.

7. The correction method according to claim 1, further comprising:

after obtaining a first second standard pixel value, dividing the correction interval into two correction sub-intervals according to the first second standard pixel value and the two first standard pixel values, wherein an end point of each correction sub-interval is the first second standard pixel value, and another end point of the correction sub-interval is one of the two first standard pixel values; and performing following operations at least once:

updating the correction sub-interval to one correction interval, wherein two end points of the correction sub-interval serve as two first standard pixel values in the updated correction interval;

correcting a current second pixel value located between the two first standard pixel values in the updated correction interval to obtain a current second standard pixel value according to the two first standard pixel values in the updated correction interval; and obtaining two updated correction sub-intervals according to the two first standard pixel values in the updated correction interval and the current second standard pixel value, wherein an end point of each updated correction sub-interval is the current second standard pixel value, and another end point of the updated correction sub-interval is one of the two first standard pixel values in the updated correction interval.

8. The correction method according to claim 1, wherein before correcting the at least two second pixel values in the correction interval, the correction method further comprises:

obtaining color temperature values corresponding to the at least two second pixel values in the correction interval; and determining whether the color temperature values corresponding to the at least two second pixel values are within the preset color temperature range;

wherein correcting the at least two second pixel values, includes:

using the at least two second pixel values as the at least two second standard color temperature values, in response to determining that the color temperature values corresponding to the at least two second pixel values are within the preset color temperature range; and correcting at least one second pixel value, in response to determining that at least one color temperature value corresponding to the at least one second pixel value of the at least two second pixel values is not within the preset color temperature range.

9. A display device, comprising:

a memory configured to store one or more computer programs; and a processor coupled to the memory and configured to execute the one or more computer programs to implement the correction method for the color temperature curve according to claim 1.

10. A non-transitory computer-readable storage medium storing a computer program that, when executed by a processor, causes the processor to implement the correction method for the color temperature curve according to claim 1.

11. A computer program product, comprising a computer program stored in a non-transitory computer-readable storage medium, wherein when executed by a processor, the computer program causes the processor to implement the correction method for the color temperature curve according to claim 1.

12. The correction method according to claim 1, wherein after obtaining the at least two second standard pixel values, the correction method further comprises:

obtaining a deviation value between the color temperature value corresponding to each second standard pixel value in the correction interval according to color temperature values corresponding to the at least two second standard pixel values and the standard color temperature value;

determining whether the deviation value between the color temperature value corresponding to each second standard pixel value in the correction interval and the standard color temperature is greater than a preset deviation value; and re-correcting the second standard pixel value until a deviation value between a color temperature value corresponding to a re-corrected second standard pixel value and the standard color temperature value is less than or equal to the preset deviation value, in response to determining that the deviation value between the color temperature value corresponding to the second standard pixel value and the standard color temperature is greater than the preset deviation value.

13. The correction method according to claim 1, wherein after obtaining the at least two second standard pixel values, the correction method further comprises:

obtaining a variance of the correction interval according to color temperature values corresponding to the at least two second standard pixel values in the correction interval and the standard color temperature value;

determining whether the variance of the correction interval is greater than a variance threshold; and re-correcting the at least two second standard pixel values in the correction interval until a variance that is obtained according to color temperature values corresponding to at least two re-corrected second standard pixel values and the standard color temperature value is less than or equal to the variance threshold, in response to determining that the variance of the correction interval is greater than the variance threshold.

14. A display device, comprising:

a memory configured to store a plurality of pixel values, wherein each pixel value includes gray scale values of at least three sub-pixels in a pixel, and the plurality of pixel values includes at least two first pixel values and a plurality of second pixel values; and a processor coupled to the memory, wherein the processor is configured to:

obtain the plurality of pixel values;

obtain at least two first standard pixel values according to the at least two first pixel values, wherein a color temperature value corresponding to each first standard pixel value is a standard color temperature value;

determine at least one correction interval according to the at least two first standard pixel values and the plurality of second pixel values, wherein a correction interval includes two first standard pixel values and at least two second pixel values located between the two first standard pixel values; and correct the at least two second pixel values in the correction interval to obtain at least two second standard pixel values according to the two first standard pixel values, wherein a color temperature value corresponding to each second standard pixel value is within a preset color temperature range in which the standard color temperature value is located; and the memory is further configured to store the at least two first standard pixel values, and the at least two second standard pixel values and color temperature values corresponding thereto;

wherein the processor is configured to obtain at least two first standard pixel values according to the at least two first pixel values, includes:

obtain color temperature values corresponding to the at least two first pixel values;

determine whether the color temperature values corresponding to the at least two first pixel values are equal to the standard color temperature value;

use the at least two first pixel values as the at least two first standard pixel values, in response to determining that the color temperature values corresponding to the at least two first pixel values are equal to the standard color temperature value; and correct at least one first pixel value until a color temperature value corresponding to each first pixel value in the at least two first pixel values is equal to the standard color temperature value, in response to determining that at least one color temperature value corresponding to the a least one first pixel value is not equal to the standard color temperature value, so that the at least two first standard pixel values are obtained;

wherein the processor is configured to correct the at least two second pixel values in the correction interval to obtain the at least two second standard pixel values according to the two first standard pixel values, includes:

obtain a second standard pixel value corresponding to each of the at least two second pixel values in the correction interval through linear interpolation according to the two first standard pixel values and each of the at least two second pixel values;

wherein the processor is configured to obtain the second standard pixel value corresponding to each of the at least two second pixel values in the correction interval through the linear interpolation according to the two first standard pixel values and each of the at least two second pixel values, includes obtain a correction ratio coefficient of a gray scale value of each sub-pixel in each first standard pixel value, wherein the correction ratio coefficient of the gray scale value of each sub-pixel in the first standard pixel value is related to a gray scale value of each sub-pixel in the first standard pixel value and a gray scale value of a corresponding sub-pixel in the first pixel value corresponding to the first standard pixel value;

obtain an interpolation step-size of a gray scale value of each sub-pixel in the second pixel value according to gray scale values of corresponding sub-pixels in the two first standard pixel values and the gray scale value of the sub-pixel in the second pixel value; and obtain the gray scale value of the sub-pixel in the second standard pixel value through the linear interpolation according to correction ratio coefficients of the gray scale values of the corresponding sub-pixels in the two first standard pixel values, the interpolation step-size of the gray scale value of the sub-pixel in the second pixel value, and the gray scale value of the sub-pixel in the second pixel value;

wherein the gray scale value of the sub-pixel in the second standard pixel value satisfies following formulas:

$$Nsz=Drive\_gain\_Ns \times Nsc, \text{ and}$$

$$Drive\_gain\_Ns=Drive\_gain\_Nex+(1-D)'Drive\_gain\_Npr, \text{ wherein}$$

D represents the interpolation step-size of the gray scale value of the sub-pixel in the second pixel value, and D is greater than or equal to 0 and less than or equal to 1; Nsz represents the gray scale value of the sub-pixel in the second standard pixel value; Nsc represents the gray scale value of the sub-pixel in the second pixel value; Drive_gain_Ns represents a correction ratio coefficient of the gray scale value of the sub-pixel in the second standard pixel value; Drive_gain_Nex represents the correction ratio coefficient of the gray scale value of the sub-pixel in a latter first standard pixel value of the two first standard pixel values; Drive_gain_Npr represents the correction ratio coefficient of the gray scale value of the sub-pixel in a previous first standard pixel value of the two first standard pixel values.

15. The display device according to claim 14, further comprising a display panel configured to display an image according to each first standard pixel value and/or each second standard pixel value.

* * * * *